United States Patent
Tsunoda et al.

(10) Patent No.: US 10,509,122 B2
(45) Date of Patent: Dec. 17, 2019

(54) DRIVING BURDEN ESTIMATION DEVICE AND DRIVING BURDEN ESTIMATION METHOD

(71) Applicant: DENSO CORPORATION, Kariya, Aichi-pref. (JP)

(72) Inventors: Ayako Tsunoda, Kariya (JP); Hiroshi Morimoto, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 280 days.

(21) Appl. No.: 15/508,175

(22) PCT Filed: Aug. 21, 2015

(86) PCT No.: PCT/JP2015/004217
§ 371 (c)(1),
(2) Date: Mar. 2, 2017

(87) PCT Pub. No.: WO2016/042706
PCT Pub. Date: Mar. 24, 2016

(65) Prior Publication Data
US 2017/0261609 A1    Sep. 14, 2017

(30) Foreign Application Priority Data

Sep. 18, 2014    (JP) ................................. 2014-190439

(51) Int. Cl.
*G01S 13/93* (2006.01)
*B60W 40/08* (2012.01)
(Continued)

(52) U.S. Cl.
CPC ........... *G01S 13/931* (2013.01); *B60W 40/08* (2013.01); *B60W 40/09* (2013.01);
(Continued)

(58) Field of Classification Search
CPC ..................................................... B60W 40/08
(Continued)

(56) References Cited

U.S. PATENT DOCUMENTS 8,872,640 B2 * 10/2014 Horseman ............. B60W 40/08
                                                     340/425.5
2003/0209893 A1 * 11/2003 Breed ...................... B60J 10/00
                                                     280/735
(Continued)

FOREIGN PATENT DOCUMENTS

JP    2003150193 A    5/2003
JP    2004190598 A    7/2004
(Continued)

OTHER PUBLICATIONS

Ito, Toshiyuki et al., "Establishment of JAMA's Safety Guideline for In-vehicle Information System and Study of a Steering Entropy Method for Evaluating Driver Workload", IATSS Review, vol. 26, No. 4, Sep. 2001, pp. 17-24.

*Primary Examiner* — Marcus E Windrich
(74) *Attorney, Agent, or Firm* — Harness, Dickey & Pierce, P.L.C.

(57) ABSTRACT

A driving burden estimation device, which is equipped to a subject vehicle and estimates a driving burden on a driver of the subject vehicle, includes a distance detection portion detecting an inter-vehicle distance between a non-subject vehicle travelling ahead of the subject vehicle and the subject vehicle, a speed detection portion detecting a traveling speed of the subject vehicle, a calculation portion calculating an inter-vehicle time taken until the subject vehicle reaches a present location of the non-subject vehicle based on the inter-vehicle distance and the traveling speed, and a burden estimation portion estimating the driving burden according to the inter-vehicle time and the traveling (Continued)

speed in such a manner that the driving burden decreases as the traveling speed becomes higher under a same inter-vehicle time.

7 Claims, 8 Drawing Sheets (51) Int. Cl.
*B60W 40/09* (2012.01)
*B60W 40/105* (2012.01)
*G01P 3/44* (2006.01)
*G01S 13/08* (2006.01)

(52) U.S. Cl.
CPC .............. *B60W 40/105* (2013.01); *G01P 3/44* (2013.01); *G01S 13/08* (2013.01); *B60W 2420/52* (2013.01); *B60W 2520/10* (2013.01); *B60W 2540/10* (2013.01); *B60W 2540/18* (2013.01); *B60W 2540/22* (2013.01); *B60W 2550/308* (2013.01); *G01S 2013/9353* (2013.01)

(58) Field of Classification Search
USPC ........................................................ 342/70–72
See application file for complete search history.

(56) References Cited

U.S. PATENT DOCUMENTS

| | | | |
|---|---|---|---|
| 2004/0154848 A1 | 8/2004 | Kitagawa et al. | |
| 2007/0021876 A1* | 1/2007 | Isaji | B60K 28/066 701/1 |
| 2008/0185207 A1 | 8/2008 | Kondoh | |
| 2010/0318254 A1 | 12/2010 | Yamamura et al. | |
| 2013/0144502 A1* | 6/2013 | Shida | B60K 31/0008 701/96 |
| 2013/0162794 A1* | 6/2013 | Wakiyama | A61B 5/18 348/77 |
| 2013/0166159 A1 | 6/2013 | Kondoh | |
| 2014/0039722 A1 | 2/2014 | Kondoh | |
| 2015/0045986 A1* | 2/2015 | Kan | B60W 40/08 701/1 |
| 2016/0029940 A1* | 2/2016 | Iizuka | B60W 50/12 701/23 |
| 2016/0101696 A1 | 4/2016 | Kondoh | |
| 2017/0021837 A1* | 1/2017 | Ebina | B60K 28/06 |
| 2017/0038774 A1* | 2/2017 | Ebina | B60W 50/14 |

FOREIGN PATENT DOCUMENTS

| | | |
|---|---|---|
| JP | 2004256089 A | 9/2004 |
| JP | 2005343317 A | 12/2005 |
| JP | 2008213823 A | 9/2008 |
| JP | 2009009495 A | 1/2009 |
| JP | 2010237953 A | 10/2010 |
| JP | 2012226602 A | 11/2012 |
| WO | WO-2012157192 A1 | 11/2012 |
| WO | WO-2013145128 A1 | 10/2013 |

* cited by examiner

● DRIVING BURDEN DETERMINATION TABLE

INTER-VEHICLE TIME

|  | 0~1 | ~2 | ~3 | ~4 | ~5 | ~6 | ~7 | ~8 | ~∞ |
|---|---|---|---|---|---|---|---|---|---|
| ~∞ | 5 | 3 | 3 | 2 | 2 | 2 | 1 | 1 | 1 |
| ~80 | 5 | 3 | 3 | 2 | 2 | 2 | 1 | 1 | 1 |
| ~70 | 5 | 3 | 3 | 3 | 2 | 2 | 2 | 1 | 1 |
| ~60 | 5 | 4 | 3 | 3 | 2 | 2 | 2 | 1 | 1 |
| ~50 | 5 | 4 | 4 | 3 | 3 | 2 | 2 | 2 | 1 |
| ~40 | 5 | 4 | 4 | 3 | 3 | 2 | 2 | 2 | 1 |
| ~30 | 5 | 5 | 4 | 3 | 3 | 3 | 2 | 2 | 1 |
| ~20 | 5 | 5 | 4 | 4 | 3 | 3 | 3 | 2 | 1 |
| 0~10 | 5 | 5 | 4 | 4 | 3 | 3 | 3 | 2 | 1 |

TRAVELING SPEED OF SUBJECT VEHICLE

DRIVING BURDEN DECREASES AS INCREASE OF TRAVELING SPEED OF SUBJECT VEHICLE UNDER SAME INTER-VEHICLE TIME

DRIVING BURDEN ESTIMATION DEVICE AND DRIVING BURDEN ESTIMATION METHOD

CROSS REFERENCE TO RELATED APPLICATIONS

This application is a U.S. National Phase Application under 35 U.S.C. 371 of International Application No. PCT/JP2015/004217 filed on Aug. 21, 2015 and published in Japanese as WO 2016/042706 A1 on Mar. 24, 2016. This application is based on and claims the benefit of priority from Japanese Patent Application No. 2014-190439 filed on Sep. 18, 2014. The entire disclosures of all of the above applications are incorporated herein by reference.

TECHNICAL FIELD

The present disclosure relates to a driving burden estimation device and a driving burden estimation method each of which estimates a burden put on a driver.

BACKGROUND ART

A periphery circumstance of a vehicle changes from time to time during the vehicle's travelling, and such periphery circumstance puts a variety of psychological and physical burden (so-called a driving burden) on a driver. An increase of the driving burden may possibly have a negative effect on a driving operation. Accordingly, attempts to eliminate such a negative effect are being made by estimating a driving burden and reflecting the estimated driving burden on various types of process executed by in-vehicle systems.

A technique to use an inter-vehicle time has been proposed recently as a technique of estimating a driving burden (Patent Literature 1). The inter-vehicle time is a time taken until a subject vehicle reaches a present location of a preceding vehicle (inter-vehicle distance/traveling speed of the subject vehicle). By estimating a driving burden using the inter-vehicle time, a driving burden from the preceding vehicle can be estimated.

PRIOR ART LITERATURE

Patent Literature

[Patent Literature 1] JP 2003-150193 A

SUMMARY OF INVENTION

In the technique of estimating a driving burden, when only an inter-vehicle time is used, a driving burden cannot be estimated at a high degree of accuracy. That is to say, given a same inter-vehicle time, a same driving burden is estimated even when a traveling speed of a subject vehicle varies considerably. Thus, a driving burden cannot be estimated at a high degree of accuracy.

In view of the foregoing difficulties, it is an object of the present disclosure to provide a driving burden estimation device and a driving burden estimation method each of which estimates a driving burden at a high degree of accuracy by using an inter-vehicle time.

According to an aspect of the present disclosure, a driving burden estimation device, which is equipped to a subject vehicle and estimates a driving burden on a driver of the subject vehicle, includes a distance detection portion detecting an inter-vehicle distance between a non-subject vehicle travelling ahead of the subject vehicle and the subject vehicle, a speed detection portion detecting a traveling speed of the subject vehicle, a calculation portion calculating an inter-vehicle time taken until the subject vehicle reaches a present location of the non-subject vehicle based on the inter-vehicle distance and the traveling speed, and a burden estimation portion estimating the driving burden according to the inter-vehicle time and the traveling speed in such a manner that the driving burden decreases as the traveling speed becomes higher under a same inter-vehicle time.

In an actual situation, a driving burden decreases as a traveling speed of the subject vehicle becomes higher, given a same inter-vehicle time. Such a variance in driving burden is thought to be attributed to a fact that given a same inter-vehicle time, an inter-vehicle distance becomes longer as a traveling speed of the subject vehicle becomes higher, due to which the preceding vehicle occupies a smaller region in a visual field of the subject vehicle's driver and also a feeling of pressure from the preceding vehicle is reduced. In view of such a situation, in the present disclosure, a driving burden is estimated so as to match with the actual situation in such a manner that the driving burden decreases as the traveling speed of the subject vehicle becomes higher, given a same inter-vehicle time. Hence, a driving burden can be estimated at a high degree of accuracy.

According to another aspect of the present disclosure, a driving burden estimation method for estimating a driving burden on a driver of a subject vehicle includes detecting an inter-vehicle distance between a non-subject vehicle travelling ahead of the subject vehicle and the subject vehicle, detecting a traveling speed of the subject vehicle, calculating an inter-vehicle time taken until the subject vehicle reaches a present location of the non-subject vehicle according to the inter-vehicle distance and the traveling speed, and estimating the driving burden according to the inter-vehicle time and the traveling speed in such a manner that the driving burden decreases as the traveling speed becomes higher under a same inter-vehicle time.

By the method described above, too, the driving burden is estimated in such a manner that the driving burden decreases as the traveling speed of the subject vehicle becomes higher, given a same inter-vehicle time. Hence, a driving burden can be estimated at a high degree of accuracy.

BRIEF DESCRIPTION OF DRAWINGS

The above and other objects, features and advantages of the present disclosure will become more apparent from the following detailed description made with reference to the accompanying drawings. In the drawings.

EMBODIMENTS FOR CARRYING OUT INVENTION

Hereinafter, embodiments of a driving burden estimation device will be described for clarification of a content of the present disclosure described above.

A. First Embodiment

A-1. Device Configuration

Figure 1:
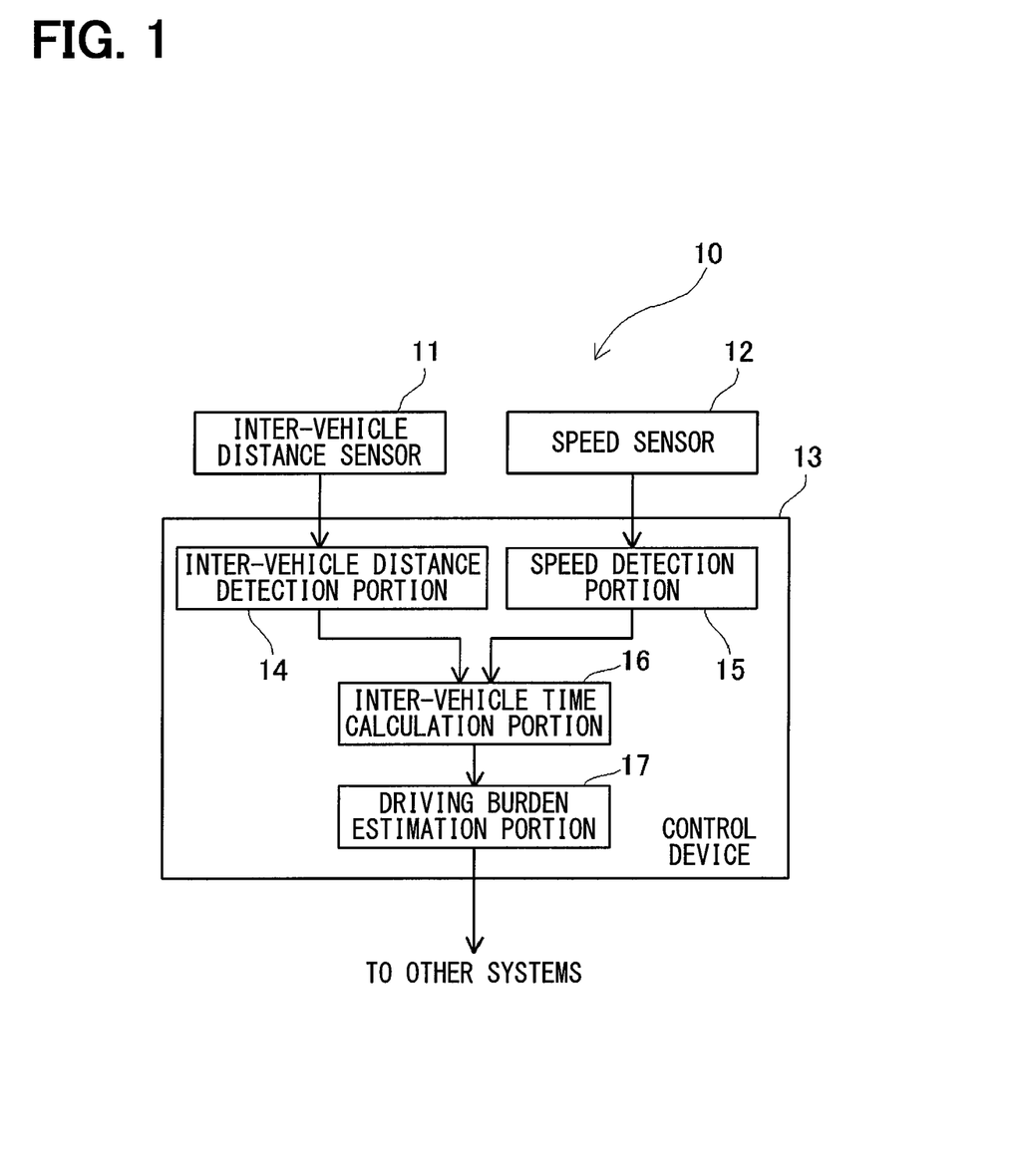
FIG. 1 is a diagram used to describe a configuration of a driving burden estimation device of a first embodiment.

FIG. 1 shows a configuration of a driving burden estimation device 10 of a first embodiment. The driving burden estimation device 10 is equipped to a vehicle (subject vehicle) and has boards provided with a CPU, a memory, various controllers, various circuits, various sensors, and so on. The boards are installed to various places in the vehicle, for example, on an inner side of an instrument panel, which is disposed in front of a driver's seat, or under the driver's seat. Various functions furnished to the driving burden estimation device 10 are realized by a cooperative operation of hardware specified as above and software stored in the memory. In the following, a part of the respective functions realized in the driving burden estimation device 10 will be described as functional blocks included in the driving burden estimation device 10.

As is shown in FIG. 1, the driving burden estimation device 10 includes an inter-vehicle distance sensor 11, such as a millimeter-wave radar, and a speed sensor 12 detecting a rotation speed of a drive shaft. The driving burden estimation device 10 also includes a control device 13 estimating a driving burden according to signals sent from the inter-vehicle distance sensor 11 and the speed sensor 12.

The control device 13 will be described in detail. The control device 13 includes an inter-vehicle distance detection portion 14 and a speed detection portion 15. The inter-vehicle distance detection portion 14 detects an "inter-vehicle distance" between a non-subject vehicle (preceding vehicle) travelling ahead of the subject vehicle according to a signal from the inter-vehicle distance sensor 11 (for example, a returning wave reflected by the preceding vehicle). The speed detection portion 15 detects a "traveling speed of the subject vehicle" according to a signal from the speed sensor 12 (for example, a vehicle speed pulse). The control device 13 also includes an inter-vehicle time calculation portion 16 calculating an "inter-vehicle time" according to the "inter-vehicle distance" detected by the inter-vehicle distance detection portion 14 and the "traveling speed" of the subject vehicle detected by the speed detection portion 15. Herein, an "inter-vehicle time" is defined as a time taken until the subject vehicle reaches a present location of the preceding vehicle, and the inter-vehicle time is calculated by dividing an "inter-vehicle distance" by a "traveling speed of the subject vehicle" (inter-vehicle distance/traveling speed of the subject vehicle).

Further, the control device 13 includes a driving burden estimation portion 17 estimating a burden (driving burden) a driver may feel according to the "inter-vehicle time" calculated by the inter-vehicle time calculation portion 16.

Herein, the "driving burden" estimated by the driving burden estimation portion 17 is sent from the driving estimation device 10 to other systems equipped to the vehicle (for example, an audio system, a navigation system, and a driving operation assistance system). Upon receipt of the "driving burden" from the driving burden estimation device 10, the respective systems perform process corresponding to the "driving burden" (predetermined process reflecting the driving burden).

The inter-vehicle distance sensor 11 and the inter-vehicle distance detection portion 14 correspond to a "distance detection portion" of the present disclosure, the speed sensor 12 and the speed detection portion 15 correspond to a "speed detection portion" of the present disclosure, the inter-vehicle time calculation portion 16 corresponds to a "calculation portion" of the present disclosure, and the driving burden estimation portion 17 corresponds to a "burden estimation portion" of the present disclosure.

The following will describe "driving burden estimation process" performed in the driving burden estimation device 10 of the first embodiment described above.

A-2. Driving Burden Estimation Process

Figure 2:
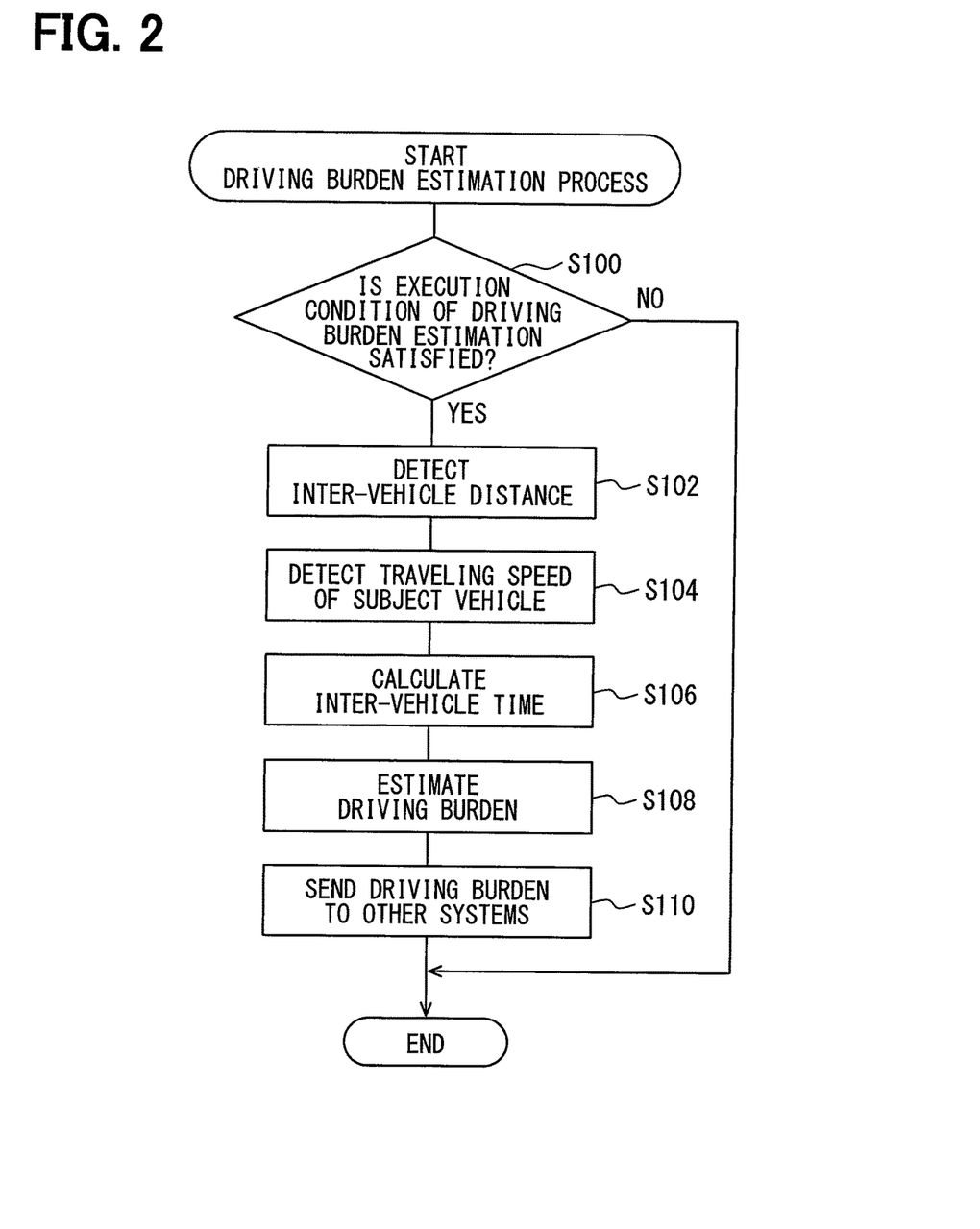
FIG. 2 is a flowchart illustrating a driving burden estimation process performed by a control device.

FIG. 2 shows a flowchart of the driving burden estimation process performed in the driving burden estimation device 10 of the first embodiment. The CPU of the driving burden estimation device 10 executes the driving burden estimation process by running programs pre-stored in the memory of the driving burden estimation device 10. In the following description, the control device 13 and the functional blocks 14 through 17 will be described as the execution subject of the driving burden estimation process. The driving burden estimation process is performed at predetermined time intervals (for example, every 100 milliseconds) as a timer interruption process after an ACC power supply of the vehicle is activated.

When the driving burden estimation process shown in FIG. 2 begins, the control device 13 determines whether a performance condition for estimating a driving burden (hereinafter, referred to as the "execution condition of driving burden estimation") is satisfied (S100). The execution condition of driving burden estimation is satisfied, for example, when a request signal requesting a driving burden is received from any other system, when a predetermined time has elapsed, when a variance in "traveling speed of the subject vehicle" is equal to or larger than a predetermined range, or when a variance in "inter-vehicle distance" is equal to or larger than a predetermined value.

When it is determined from a result of determination process in S100 that the execution condition of driving burden estimation is not yet satisfied (S100: no), the driving burden estimation process shown in FIG. 2 is directly ended. Meanwhile, when it is determined that the execution condition of driving burden estimation is satisfied (S100: yes), process in following S102 through S108 is performed to estimate a driving burden.

Firstly, the inter-vehicle distance detection portion 14 detects an "inter-vehicle distance" between the preceding vehicle and the subject vehicle according to a signal from the inter-vehicle distance sensor 11 (S102). Subsequently, the speed detection portion 15 detects a "traveling speed of the subject vehicle" according to a signal from the speed sensor 12 (S104). Subsequently, the inter-vehicle time calculation portion 16 calculates an "inter-vehicle time", which is a time taken until the subject vehicle reaches a present location of the preceding vehicle, by dividing the "inter-vehicle distance" detected by the inter-vehicle distance detection portion 14 by the "traveling speed of the subject vehicle" detected by the speed detection portion 15 (S106). The driving burden estimation portion 17 estimates a driving burden according to the "inter-vehicle time" calculated by the inter-vehicle time calculation portion 16 (S108).

A relation of an "inter-vehicle time" and a driving burden will be discussed in the following. As has been described above, an "inter-vehicle time" is a time taken until the subject vehicle reaches a present location of the preceding vehicle. Hence, a hypothesis that a driving burden increases as an "inter-vehicle time" becomes shorter (first hypothesis) is formulated understandably. For example, when a comparison is made between a case where the subject vehicle reaches a present location of the preceding vehicle in one second (when an inter-vehicle time is one second) and a case where the subject vehicle reaches the present location of the preceding vehicle in two seconds (when an inter-vehicle time is two seconds), a driving burden is thought to be larger in the case where the subject vehicle reaches the present location of the preceding vehicle in one second (when an inter-vehicle time is one second).

In some cases, even when a "traveling speed of the subject vehicle" is different, the "inter-vehicle time" is calculated to have the same value. For example, in a case where a "traveling speed of the subject vehicle" is 40 km/h and an "inter-vehicle distance" is about 44.4 m, then an "inter-vehicle time" is calculated to be four seconds. Meanwhile, in a case where a "traveling speed of the subject vehicle" is 80 km/h and an "inter-vehicle distance" is about 88.8 m, then an "inter-vehicle time" is also calculated to be four seconds. In such cases where a same "inter-vehicle time" is given, a hypothesis that a driving burden increases as a "traveling speed of the subject vehicle" becomes higher (second hypothesis) is intuitively formulated. In the two cases above, given four seconds as a same "inter-vehicle time, a driving burden is thought to be larger in the case where a "traveling speed of the subject vehicle" is 80 km/h than in the case where a "traveling speed of the subject vehicle" is 40 km/h. The second hypothesis is formulated because it is generally (by intuition) thought that a driving burden increases as a "traveling speed of the subject vehicle" increases. According to the technique in the above-described related art, a driving burden is actually estimated on the basis of not only the first hypothesis but also the second hypothesis that a driving burden increases as a "traveling speed of the subject vehicle" becomes higher, given a same "inter-vehicle time".

Figure 3:
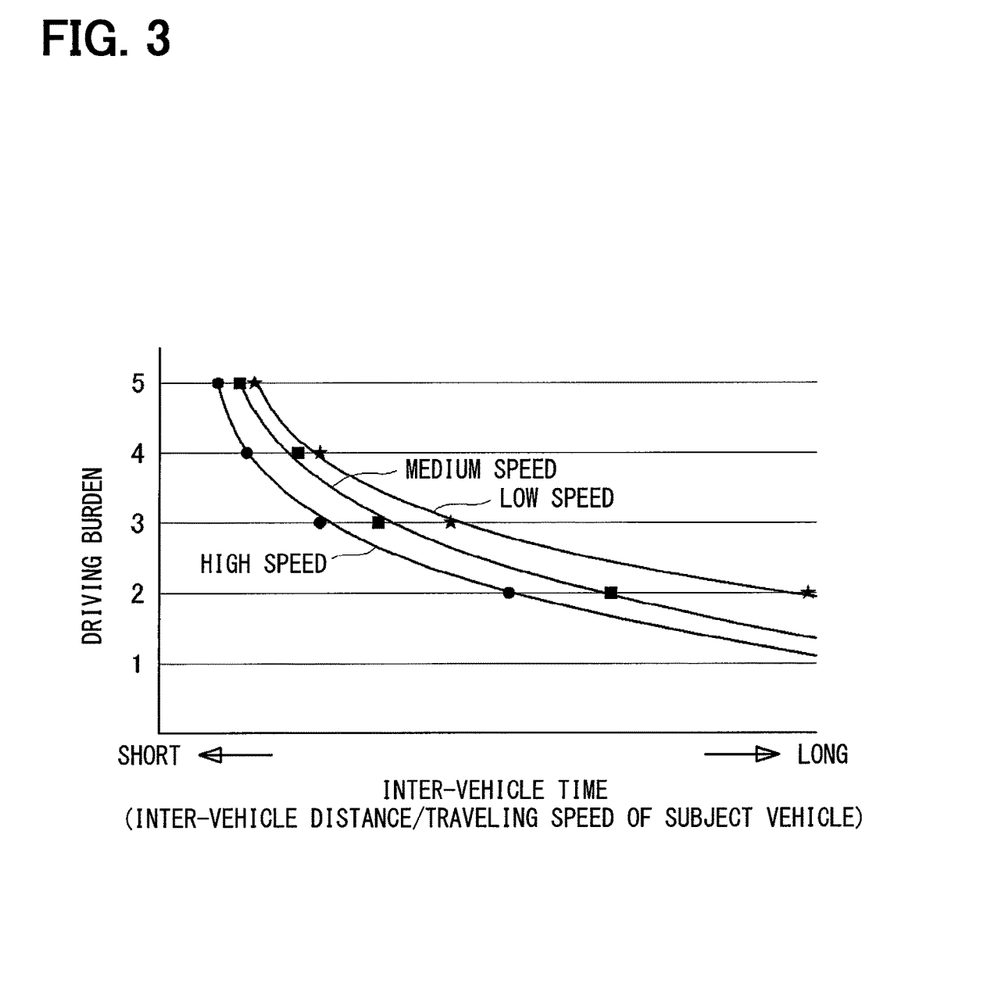
FIG. 3 is a diagram used to describe a relation of an inter-vehicle time and a traveling speed of a subject vehicle with respect to a driving burden.

In order to verify the first hypothesis and the second hypothesis, inventors of the present disclosure conducted a driving test in which multiple test subjects were required to drive at various "traveling speeds of the subject vehicle" and various "inter-vehicle times". In this driving test, driving burden is estimated on a scale of 1 to 5, where 5 is a maximum level and 1 is a minimum level. FIG. 3 is a diagram used to describe a test result (average of the multiple test subjects). It is understood from the test result that the first hypothesis that a driving burden increases as an "inter-vehicle time" becomes shorter is verified. For example, as is shown in FIG. 3, a result derived from the test is that a driving burden increases as an "inter-vehicle time" becomes shorter in each of the cases whether "a traveling speed of the subject vehicle" is low, medium, or high.

On the contrary, the second hypothesis that given a same "inter-vehicle time", a driving burden increases as a "traveling speed of the subject vehicle" becomes higher is not verified. As is shown in FIG. 3, a result opposite to the second hypothesis is derived. Of results shown in FIG. 3, by paying attention to, for example, positions at a driving burden of "3", in order to maintain the same driving burden, a longer "inter-vehicle time" has to be secured as a "traveling speed of the subject vehicle" is reduced from a high speed to a medium speed, and further to a low speed. That is to say, a result derived from the test is that a driving burden decreases as a "traveling speed of the subject vehicle" becomes higher, given a same "inter-vehicle time".

Figure 4A:
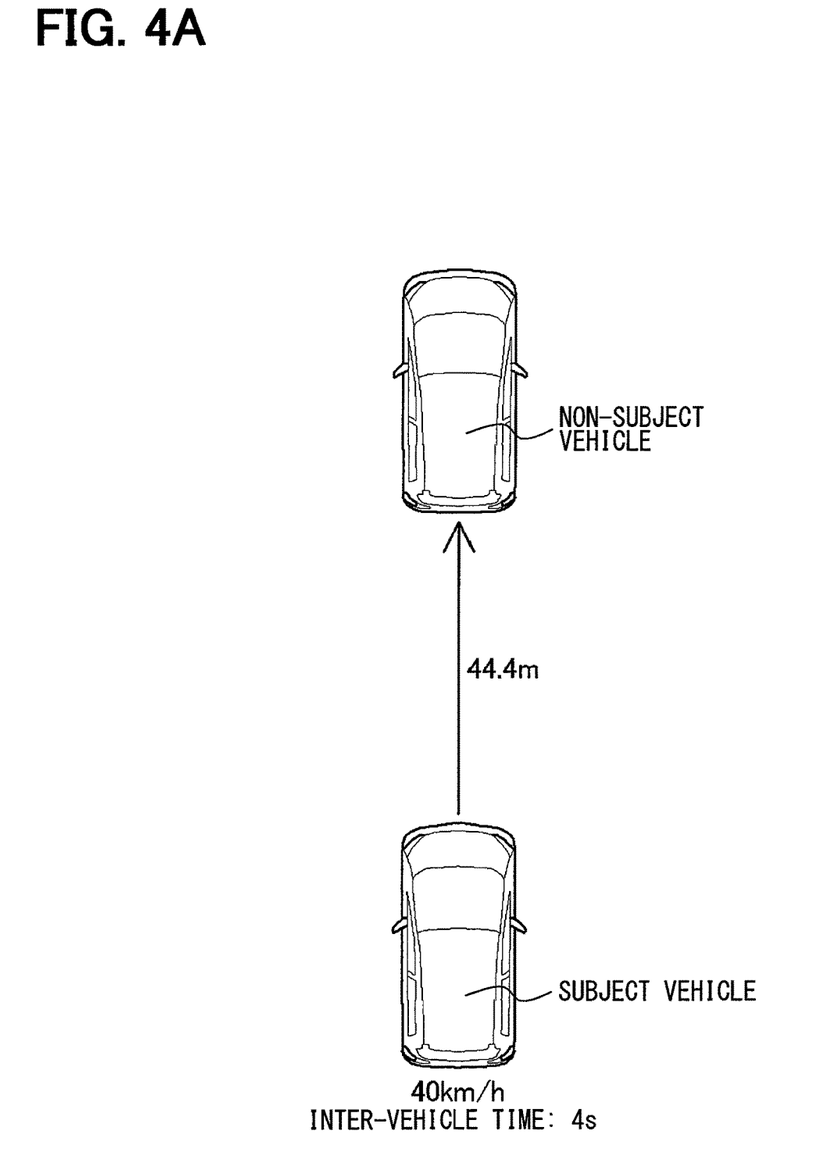
FIG. 4A is a diagram used to describe an example of a traveling speed of the subject vehicle and an inter-vehicle distance.
Figure 4B:
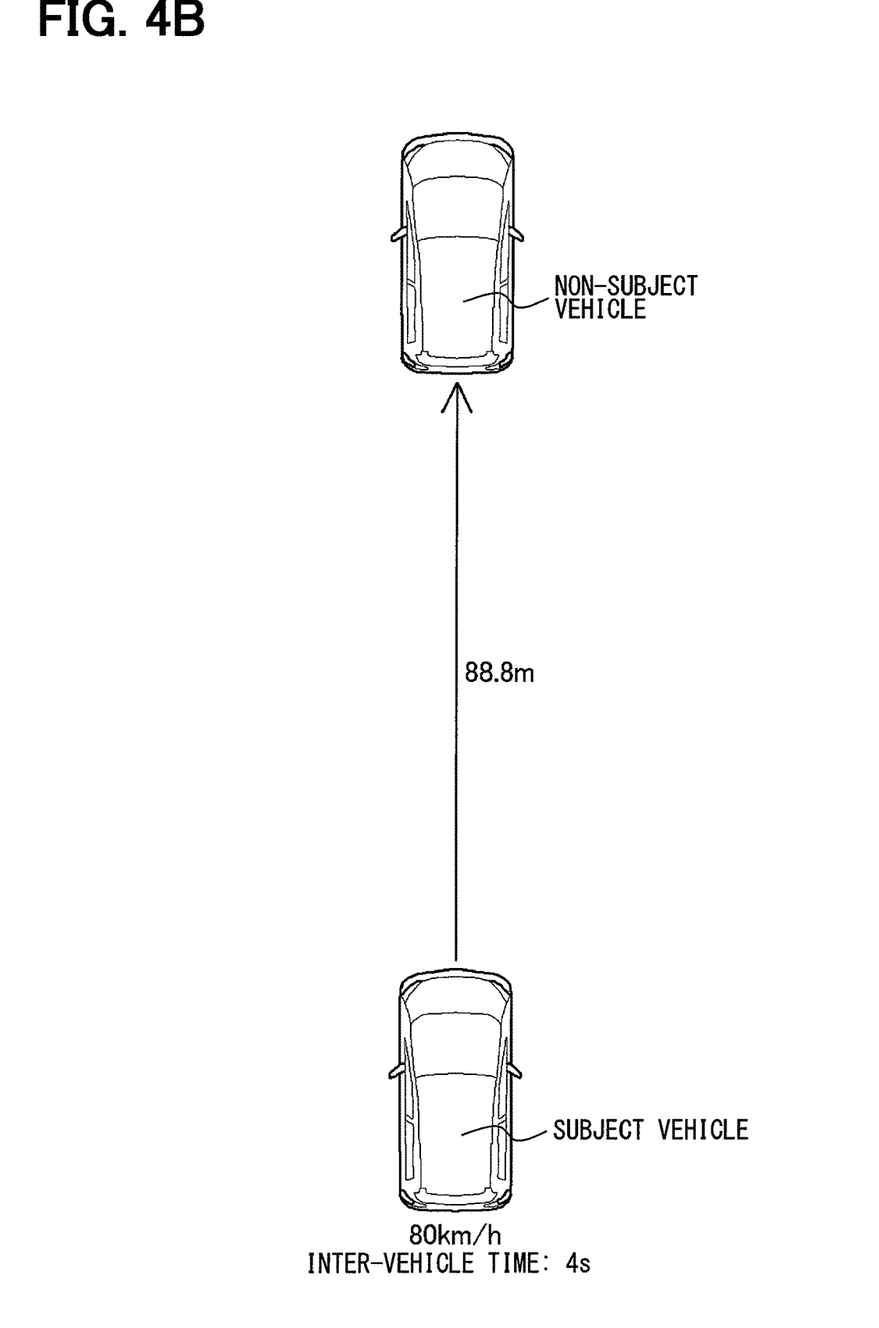
FIG. 4B is a diagram used to describe another example of a traveling speed of the subject vehicle and an inter-vehicle distance where an inter-vehicle time is same as the inter-vehicle time shown in FIG. 4A and a traveling speed is different from the traveling speed of the subject vehicle shown in FIG. 4A.

Such an opposite result is thought to be caused by the following reasons. As is shown in FIG. 4A and FIG. 4B, an "inter-vehicle distance" becomes longer as a "traveling speed of the subject vehicle" becomes higher. Thus, the preceding vehicle occupies a smaller region in a visual field of the driver and also a pressure felt by the subject vehicle's driver from the preceding vehicle is reduced. That is to say, given a same "inter-vehicle time", it is intuitively thought that a driving burden is more likely to increase as a "traveling speed of the subject vehicle" becomes higher (second hypothesis). On the contrary, however, a driving burden is actually decreased as a "traveling speed of the subject vehicle" becomes higher since a pressure felt by the driver from the preceding vehicle is reduced.

As has been described, the first hypothesis that a driving burden increases as an "inter-vehicle time" becomes shorter is verified. However, the second hypothesis in which a driving burden increases as a "traveling speed of the subject vehicle" becomes higher under a same "inter-vehicle time" is not verified. On the contrary, a result that given a same "inter-vehicle time", a driving burden decreases as a "traveling speed of the subject vehicle" becomes higher is derived, and this result is completely opposite to the above-described second hypothesis. Thus, in the technique of the related art, a driving burden different from an actual driving burden is estimated since the driving burden is estimated on the basis of not only the first hypothesis but also on the basis of the second hypothesis which is proved to be incorrect as described above.

In the present disclosure, the driving burden estimation device 10 of the first embodiment estimates a driving burden on the basis of not only the first hypothesis but also an actual situation opposite to the second hypothesis (herein, the actual situation means a driving burden decreases as a "traveling speed of the subject vehicle" becomes higher, given a same "inter-vehicle time").

Figure 5:
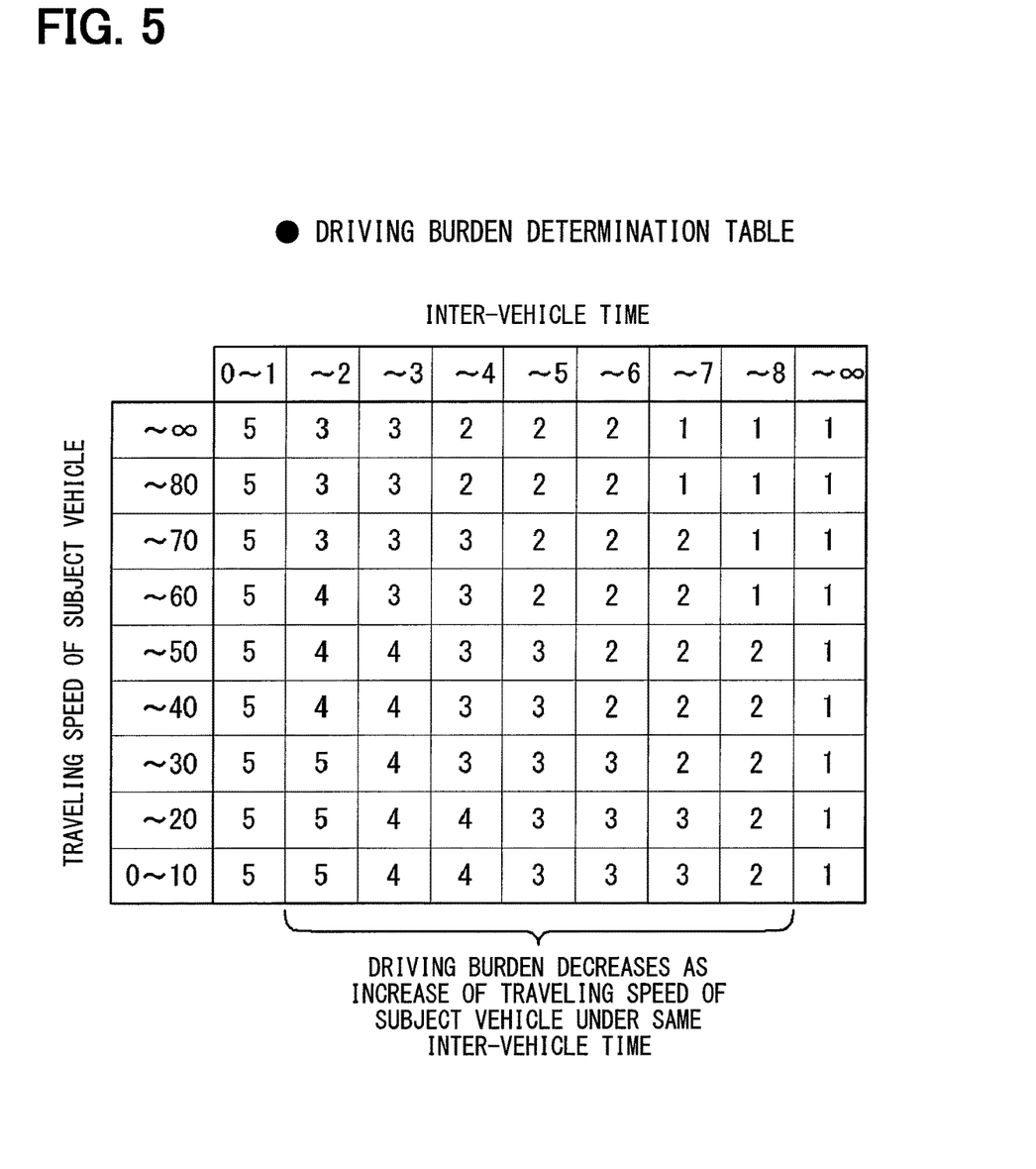
FIG. 5 is a diagram used to conceptually describe a driving burden determination table.

That is to say, a driving burden is estimated with reference to a driving burden determination table as shown in FIG. 5 in process of S108 shown in FIG. 2 (process for estimating a driving burden). The driving burden determination table is a data table pre-stored in the memory of the driving burden estimation device 10. As is shown in FIG. 5, each driving burden is set in such a manner that the driving burden increases as an "inter-vehicle time" becomes shorter and decreases as a "traveling speed of the subject vehicle" becomes higher under the same "inter-vehicle time" (that is, so as to be consistent with the above-described test result shown in FIG. 3).

In the process of S108, the driving burden estimation portion 17 determines (estimates), based on the "traveling speed of the subject vehicle" detected in S104 and the "inter-vehicle time" calculated in S106, a driving burden corresponding to the obtained "traveling speed of the subject vehicle" and the obtained "inter-vehicle time" by referring to the driving burden determination table shown in FIG. 5. For example, given that the "traveling speed of the subject vehicle" is 40 km/h and the "inter-vehicle time" is three seconds, the driving burden estimation portion 17 estimates that a driving burden is equal to "4". Also, given that the "traveling speed of the subject vehicle" is 80 km/h and the "inter-vehicle time" is three seconds, the driving burden estimation portion 17 estimates that a driving burden is equal to "3".

After the driving burden is estimated in the manner as above (S108), the driving burden is sent to other systems (an audio system, a navigation system, a driving operation assistance system, and so on). Upon receipt of the "driving burden" from the driving burden estimation device 10, the respective systems perform process corresponding to the estimated "driving burden". For example, when the driving burden is small, the systems display a menu screen (a song title selection screen or a destination selection screen) on which the driver is allowed to input manipulation. On the other hand, when the driving burden is large, the system does not display the menu screen. A value of the estimated driving burden is not only sent to other systems, but can be also used in the driving burden estimation device 10.

As has been described, the driving burden estimation device 10 of the first embodiment estimates a driving burden with reference to an actual situation that a driving burden increases as an "inter-vehicle time" becomes shorter and decreases as a "traveling speed of the subject vehicle" becomes higher under the same "inter-vehicle time". Hence, a driving burden can be estimated at a high degree of accuracy using an "inter-vehicle time".

Also, because a driving burden is estimated using the driving burden determination table set so as to match the actual situation, a driving burden can be estimated at a high degree of accuracy by simple process (by merely referring to the driving burden determination table).

When an amount of change in "traveling speed of the subject vehicle" is equal to or larger than a predetermined value or an amount of change in "inter-vehicle distance" is equal to or larger than a predetermined value, it is considered that an amount of change in driving burden is also equal to or larger than a predetermined value. Thus, when the amount of change in traveling speed or in inter-vehicle distance is equal to or larger than the predetermined value, it is determined that the execution condition of driving burden estimation is satisfied (an estimation of driving burden is started). In this configuration, the driving burden can be estimated when the driving burden is liable to vary. Hence, a driving burden can be estimated effectively.

B. Second Embodiment

A driving burden estimation device 20 of a second embodiment will now be described. In the second embodiment, the driving burden estimation device estimates a driving burden (referred to as a "first driving burden" in the second embodiment) as a driving burden estimated by the driving burden estimation device of the first embodiment above. In addition, in the second embodiment, the driving burden estimation device further estimates a second driving burden different from the first driving burden. A description of a configuration similar to the configuration of the first embodiment above is omitted in the second embodiment.

B-1. Device Configuration

Figure 6:
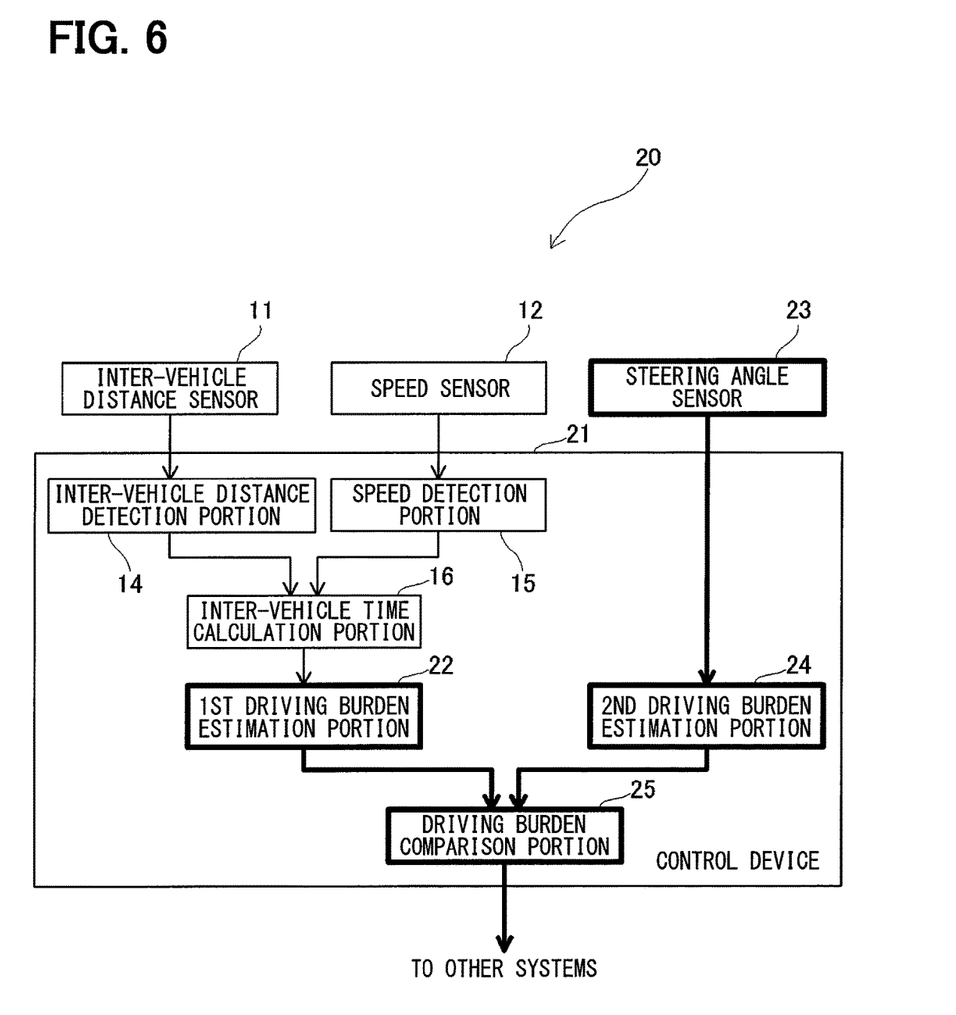
FIG. 6 is a diagram used to describe a configuration of a driving burden estimation device of a second embodiment.

FIG. 6 shows a configuration of the driving burden estimation device 20 of the second embodiment. As is shown in FIG. 6, the driving burden estimation device 20 of the second embodiment includes an inter-vehicle distance sensor 11 and a speed sensor 12 similar to the first embodiment above. A control device 21 of the driving burden estimation device 20 according to the second embodiment includes an inter-vehicle distance detection portion 14, a speed detection portion 15, and an inter-vehicle time calculation portion 16 as in the first embodiment above. Further, the control device 21 of the second embodiment includes a first driving burden estimation portion 22. The first driving burden estimation portion 22 is different from the driving burden estimation portion 17 of the first embodiment above only in that the first driving burden estimation portion 22 estimates a driving burden estimated in the first embodiment above as a first driving burden. The first driving burden estimation portion 22 is therefore substantially same as the driving burden estimation portion 17 of the first embodiment above.

In addition to the configuration as above, the driving burden estimation device 20 of the second embodiment further includes a steering angle sensor 23 detecting a steering angle of a steering wheel. In addition, the control device 21 of the second embodiment includes a second driving burden estimation portion 24 estimating a driving burden (hereinafter referred to as a "second driving burden") according to a steering angle of the steering wheel detected by the steering angle sensor 23. Further, the control device 21 of the second embodiment includes a driving burden comparison portion 25 comparing the first driving burden estimated by the first driving burden estimation portion 22 and the second driving burden estimated by the second driving burden estimation portion 24.

The first driving burden estimation portion 22 corresponds to a "burden estimation portion" of the present disclosure, the second driving burden estimation portion 24 corresponds to a "different burden estimation portion" of the present disclosure, and the driving burden comparison portion 25 corresponds to a "determination portion" of the present disclosure.

In the following, "driving burden estimation process" executed by the driving burden estimation device 20 of the second embodiment will be described.

B-2. Driving Burden Estimation Process

Figure 7:
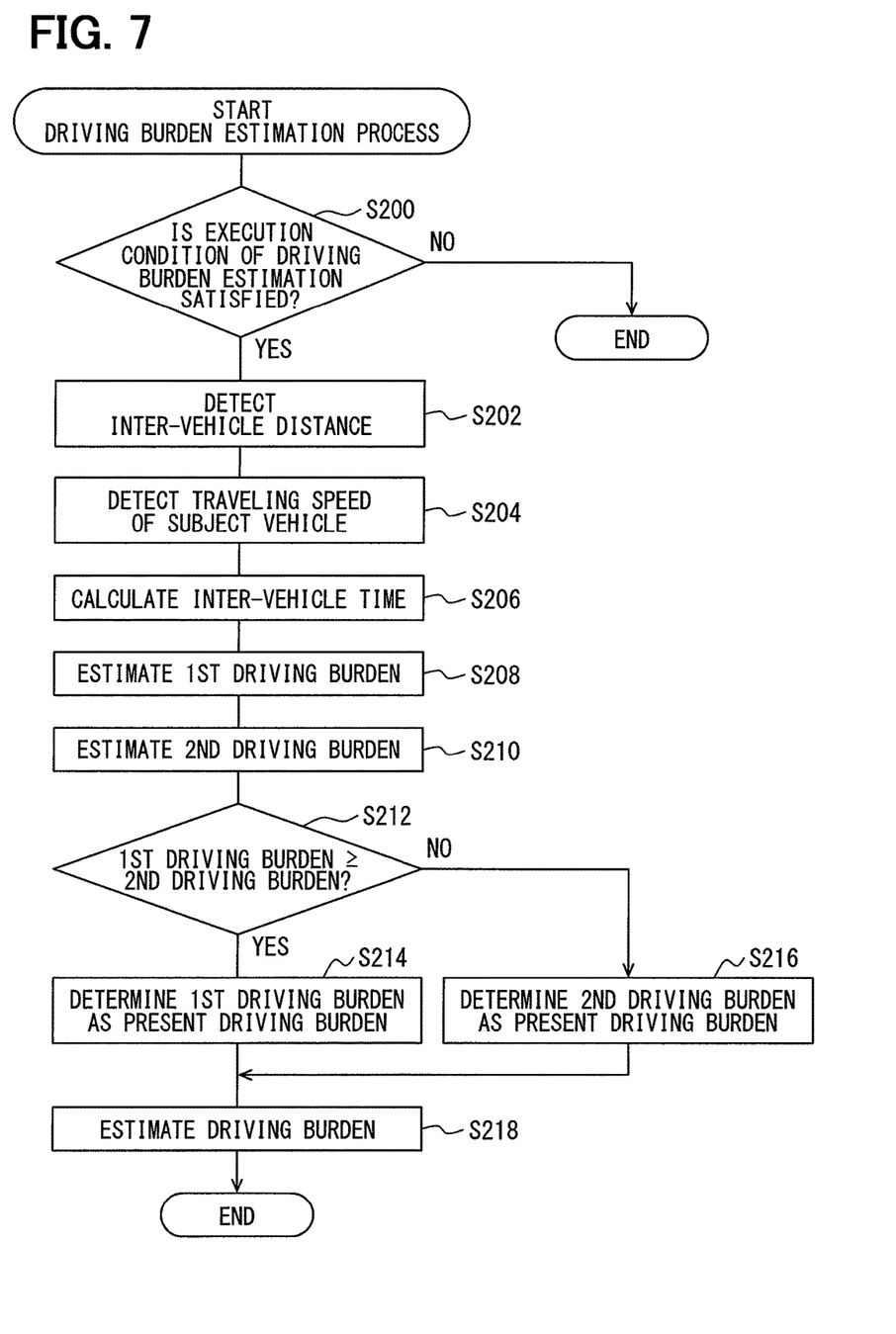
FIG. 7 is a flowchart illustrating driving burden estimation process performed by a control device.

FIG. 7 shows a flowchart of the driving burden estimation process executed by the driving burden estimation device 20 of the second embodiment. The CPU of the driving burden estimation device 20 executes the driving burden estimation process by running programs pre-stored in the memory of the driving burden estimation device 20. In the following description, the control device 21 and the functional blocks 14 through 16, 22, 24, and 25 will be described as the execution subject of the driving burden estimation process. The driving burden estimation process is performed at predetermined time intervals (for example, every 100 milliseconds) as a timer interruption process after an ACC power supply of a vehicle is activated.

When the driving burden estimation process shown in FIG. 7 begins, the control device 21 determines whether an execution condition of driving burden estimation is satisfied (S200) similar to the first embodiment above (S100 of FIG. 2). When determining that the execution condition of driving burden estimation is not yet satisfied (S200: no), the driving burden estimation process shown in FIG. 7 is directly ended.

When it is determined that the execution condition of driving burden estimation is satisfied (S200: yes), similar to the first embodiment above (S102 through S108 of FIG. 2), the inter-vehicle distance detection portion 14 detects an "inter-vehicle distance" between a preceding vehicle and a subject vehicle according to a signal from the inter-vehicle distance sensor (S202), and the speed detection portion 15 detects a "traveling speed of the subject vehicle" according to a signal from the speed sensor 12 (S204). Subsequently, the inter-vehicle time calculation portion 16 calculates an "inter-vehicle time", which is a time taken until the subject vehicle reaches a present location of the preceding vehicle, by dividing the "inter-vehicle distance" detected by the inter-vehicle distance detection portion 14 by the "traveling speed of the subject vehicle" detected by the speed detection portion 15 (S206). The first driving burden estimation portion 22 obtains the "traveling speed of the subject vehicle" detected in S204 and the "inter-vehicle time" calculated in S206, and determines (estimates) a first driving burden (a driving burden similar to the driving burden estimated in the first embodiment above) corresponding to the obtained "traveling speed of the subject vehicle" and the obtained "inter-vehicle time" by referring to a driving burden determination table shown in FIG. 5 (S208).

Subsequently, the second driving burden estimation portion 24 estimates a second driving burden according to the steering angle of the steering wheel detected by the steering angle detection sensor 23 (S210). For example, the second driving burden estimation portion 24 estimates the second driving burden using a known steering entropy method.

The steering entropy method will be described briefly. In a case where a driver is distracted from driving because of a driving burden (herein, the second driving burden), the steering wheel is left unattended for a longer time than a time in normal driving and a large amount of error in the steering angle is accumulated. Hence, when the driver's attention is back to driving, a correction amount of steering operation becomes larger than normal driving. The steering entropy method puts a focus on such characteristics, and is a method of calculating a driving burden (herein, the second driving burden) from smoothness of a steering angle of the steering wheel. In the present embodiment, the second driving burden is also estimated on a scale of 1 to 5, where 5 is a maximum level and 1 is a minimum level similar to the first driving burden.

After the first driving burden is estimated (S208) and also the second driving burden is estimated (S210), the driving burden comparison portion 25 compares the first driving burden with the second driving burden. When the first driving burden is equal to or larger than the second driving burden (S212: yes), the first driving burden is determined as a present driving burden. Meanwhile, when the first driving burden is smaller than the second driving burden (S212: no), the second driving burden is determined as the present driving burden. In short, one of the first driving burden or the second driving burden whichever is the larger is determined as the present driving burden.

After the driving burden is estimated in the manner as above (S214 or S216), similar to the first embodiment above (S110 of FIG. 2), the driving burden is sent to other systems (an audio system, a navigation system, a driving operation assistance system, and so on) (S218). A value of the estimated driving burden is not only sent to the other systems, but can be also used in the driving burden estimation device 20.

As has been described, the driving burden estimation device 20 of the second embodiment estimates the first driving burden according to an "inter-vehicle time" and a "traveling speed of the subject vehicle", and also estimates the second driving burden according to a manner of an operation on the steering wheel (manner of a driving operation), and determines one of the first driving burden or the second driving burden whichever is the larger as a present driving burden (the driving burden to be sent to other systems). A driving burden is related to a psychological condition of the driver. Hence, it is preferable to estimate a maximum diving burden in a possibly wide range from a safety concern. In view of such a preference, because the driving burden estimation device 20 of the second embodiment determines one of the estimated first driving burden or the estimated second driving burden whichever is the larger as the present driving burden, safety can be enhanced.

While the above has described the driving burden estimation devices according to the embodiments, it should be appreciated that the present disclosure is not limited to the embodiments and the modifications described above and can be modified in various manners within the scope of the present disclosure.

For example, the first embodiment and the second embodiment above adopt a method of estimating a driving burden (first driving burden in the second embodiment) using the driving burden determination table. However, the estimation method is not limited to the above-described method and any other method can be adopted as long as a driving burden is estimated in such a manner that the driving burden increases as an "inter-vehicle time" becomes shorter and decreases as a "traveling speed of the subject vehicle" becomes higher under the same "inter-vehicle time". For example, alternative methods include a method of calculating a driving burden using a predetermined relational expression in which an "inter-vehicle time" and a "traveling speed of the subject vehicle" are taken into consideration. The alternative methods also include a method of calculating a driving burden by calculating a temporary driving burden according to an "inter-vehicle time" first, and then adding a weight to the calculated driving burden in such a manner that the driving burden decreases as a "traveling speed of the subject vehicle" becomes higher.

In the second embodiment above, one of the first driving burden or the second driving burden whichever is the larger is determined as a driving burden estimated presently (to be sent to other systems). However, the present disclosure is not limited to the configuration as above and an average of the first driving burden and the second driving burden may be determined as a present driving burden (to be sent to the other systems). When configured in such a manner, a driving burden can be estimated at a further higher degree of accuracy.

In the second embodiment above, the steering entropy method is adopted as the estimation method of the second driving burden according to a manner of a driving operation. However, the estimation method is not limited to the steering entropy method and various other estimation methods can be also adopted. For example, alternative methods include a method of estimating the second driving burden according to a manner of an operation on an accelerator and a method of estimating the second driving burden according to a manner of an operation on a brake pedal.

It is noted that a flowchart or the processing of the flowchart in the present disclosure includes portions (also referred to as steps), each of which is represented, for instance, as S100. Further, each portion can be divided into several sub-portions while several portions can be combined into a single portion. Furthermore, each of thus configured portions can be also referred to as a circuit, device, module, or means. Each or any combination of portions explained in the above can be achieved as (i) a software portion in combination with a hardware unit (e.g., computer) or (ii) a hardware portion, including or not including a function of a related apparatus; furthermore, the hardware portion (e.g., integrated circuit, hard-wired logic circuit) may be constructed inside of a microcomputer.

While the disclosure has been described with reference to preferred embodiments thereof, it is to be understood that the disclosure is not limited to the preferred embodiments and constructions. The disclosure is intended to cover various modification and equivalent arrangements. In addition, while the various combinations and configurations, which are preferred, other combinations and configurations, including more, less or only a single element, are also within the spirit and scope of the disclosure.

The invention claimed is:

1. A driving burden estimation device equipped to a subject vehicle and estimating a driving burden on a driver of the subject vehicle, the driving burden including a feeling of pressure from a non-subject vehicle ahead of the subject vehicle, the driving burden estimation device comprising:
    a distance detection portion detecting an inter-vehicle distance between the non-subject vehicle and the subject vehicle;
    a speed detection portion detecting a traveling speed of the subject vehicle;
    a calculation portion calculating an inter-vehicle time taken until the subject vehicle reaches a present location of the non-subject vehicle based on the inter-vehicle distance and the traveling speed;
    a burden estimation portion estimating the driving burden according to the inter-vehicle time and the traveling speed in such a manner that the driving burden decreases as the traveling speed becomes higher under a same inter-vehicle time; and
    a different burden estimation portion provided separately from the burden estimation portion and estimating a driving burden according to a steering angle of a steering wheel, a manner of an operation on an accelerator, or a manner of an operation on a brake pedal, and sending at least one of the driving burdens to an internal module in the driving burden estimation device or an external system.

2. The driving burden estimation device according to claim 1, wherein
    the burden estimation portion estimates the driving burden by referring to a data table in which the driving burden is set in correlation with the inter-vehicle time and the traveling speed, and
    in the data table, the driving burden is set in such a manner that the driving burden decreases as the traveling speed becomes higher under a same inter-vehicle time.

3. The driving burden estimation device according to claim 1, further comprising:
    a determination portion determining a larger one between the driving burden estimated by the burden estimation portion and the driving burden estimated by the different burden estimation portion as the driving burden to be sent to the internal module in the driving burden estimation device or the external system.

4. A driving burden estimation method for estimating a driving burden on a driver of a subject vehicle, the driving burden including a feeling of pressure from a non-subject vehicle ahead of the subject vehicle, the driving burden estimation method comprising:
    detecting an inter-vehicle distance between the non-subject vehicle and the subject vehicle;
    detecting a traveling speed of the subject vehicle;
    calculating an inter-vehicle time taken until the subject vehicle reaches a present location of the non-subject vehicle according to the inter-vehicle distance and the traveling speed;
    estimating the driving burden according to the inter-vehicle time and the traveling speed in such a manner that the driving burden decreases as the traveling speed becomes higher under a same inter-vehicle time;
    estimating a driving burden, separately from the driving burden according to the inner-vehicle time and the traveling speed, according to a steering angle of a steering wheel, a manner of an operation on an accelerator, or a manner of an operation on a brake pedal; and
    sending at least one of the driving burdens to an internal module in a drive burden estimation device or an external system.

5. The driving burden estimation device according to claim 1, wherein
    the external system includes an audio system, a navigation system, or a driving operation assistance system.

6. The driving burden estimation method according to claim 4, wherein
    the external system includes an audio system, a navigation system, or a driving operation assistance system.

7. The driving burden estimation method according to claim 4, further comprising:
    determining a larger one between the driving burden according to the inter-vehicle time and the traveling speed and the driving burden according to the steering angle of the steering wheel, the manner of an operation on the accelerator, or the manner of an operation on the brake pedal as the driving burden to be sent to the internal module in the driving burden estimation device or the external system.

* * * * *